F. B. NORTHRUP.
INVERTED RAM PRESS.
APPLICATION FILED OCT. 8, 1914.
1,158,830.
Patented Nov. 2, 1915.
4 SHEETS—SHEET 2.
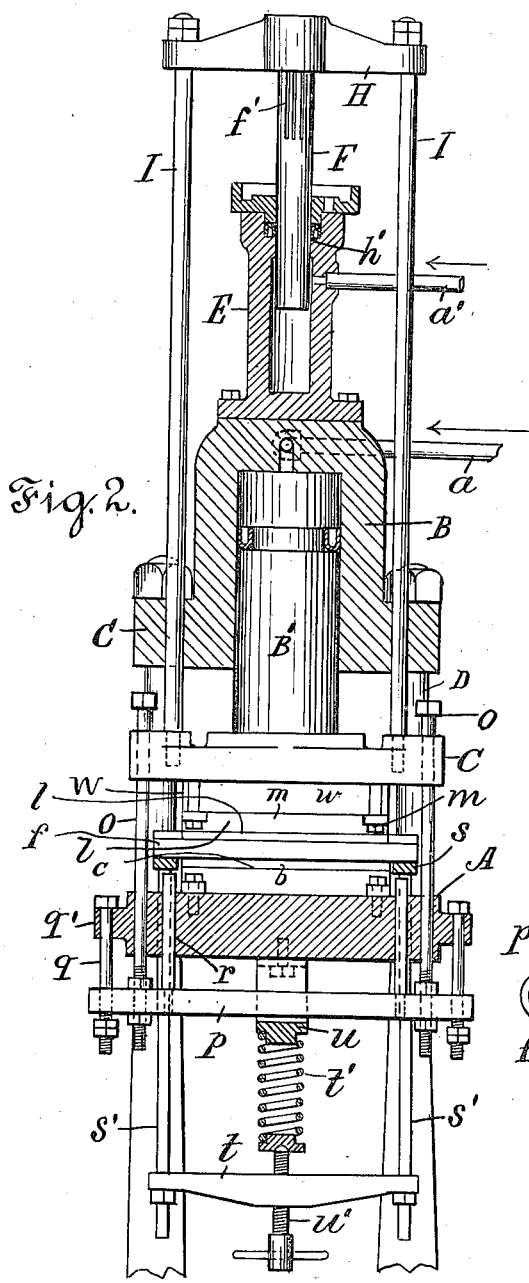
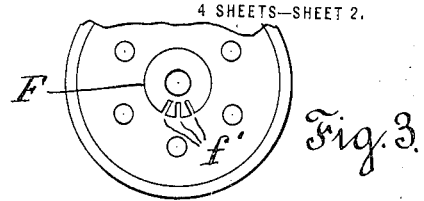
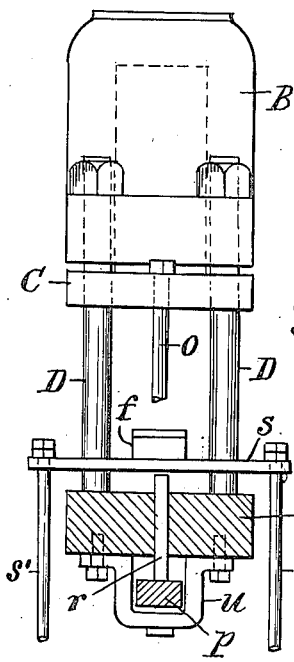
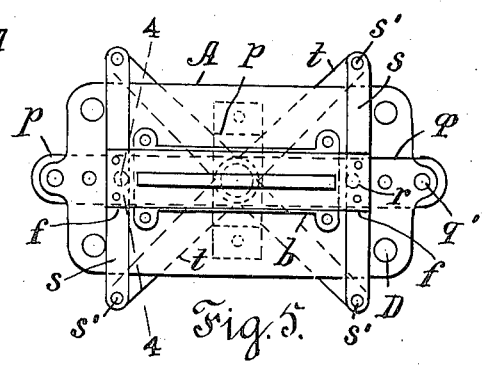
Witnesses:
L. Lee
J. Walter Greenbowe
Inventor
Francis B. Northrup, per
Thomas S. Crane, Atty.

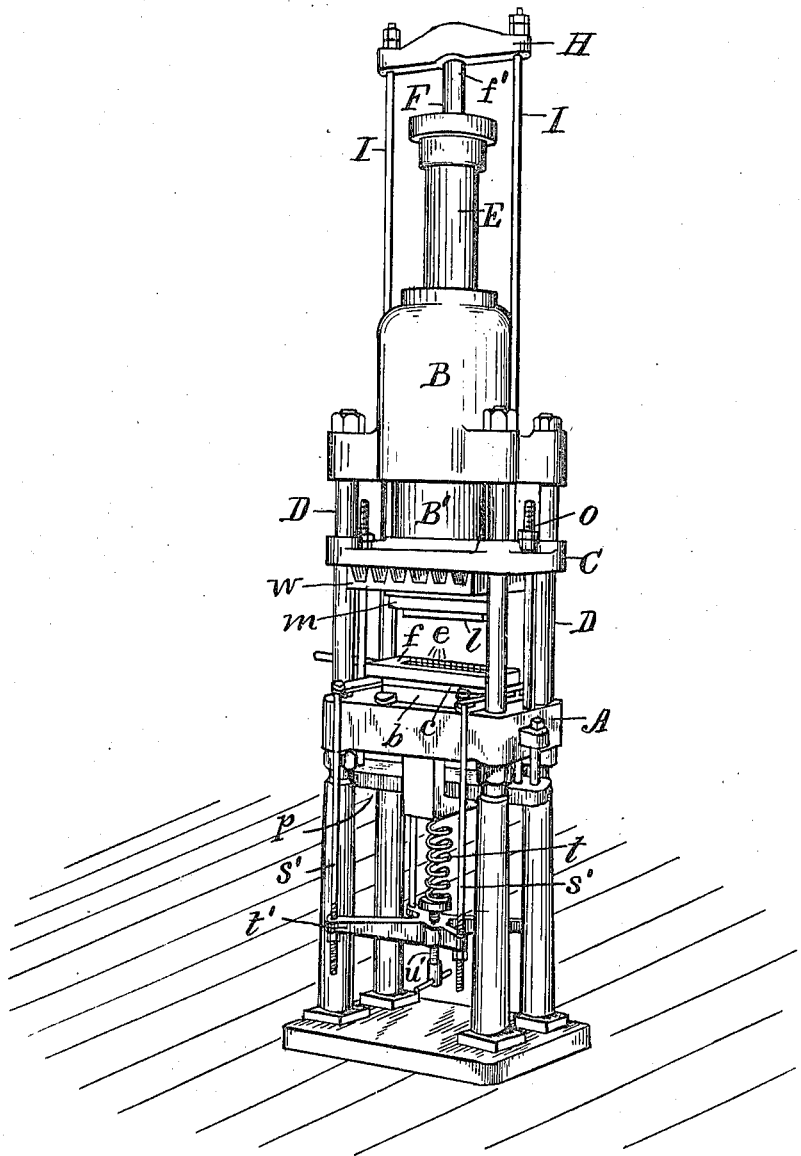

F. B. NORTHRUP.
INVERTED RAM PRESS.
APPLICATION FILED OCT. 8, 1914.
1,158,830.
Patented Nov. 2, 1915.
4 SHEETS—SHEET 3.
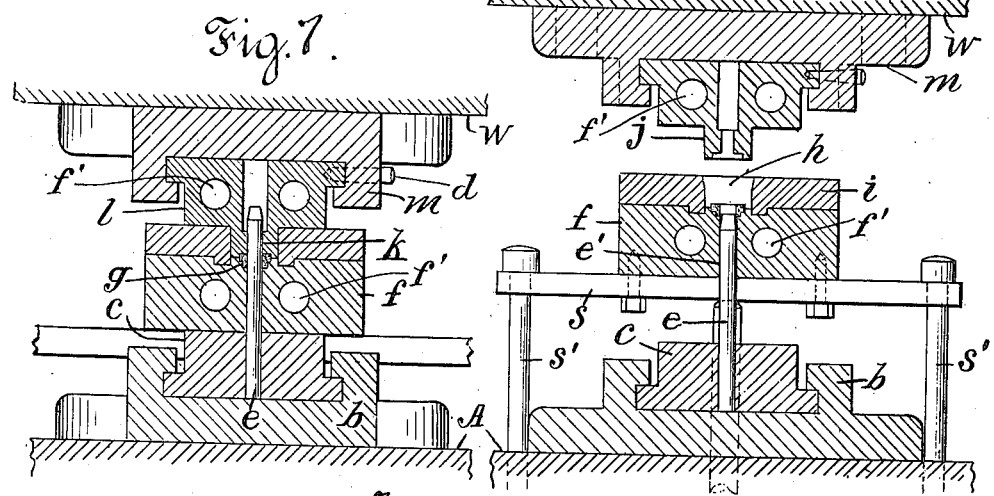
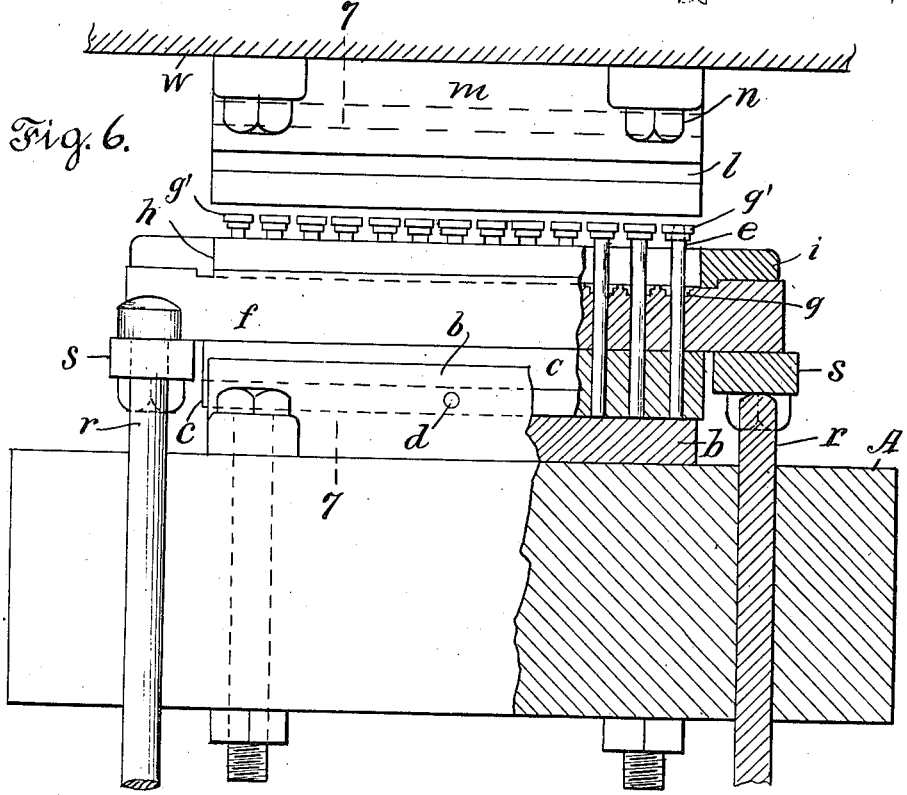

F. B. NORTHRUP.
INVERTED RAM PRESS.
APPLICATION FILED OCT. 8, 1914.
1,158,830.
Patented Nov. 2, 1915.
4 SHEETS—SHEET 4.
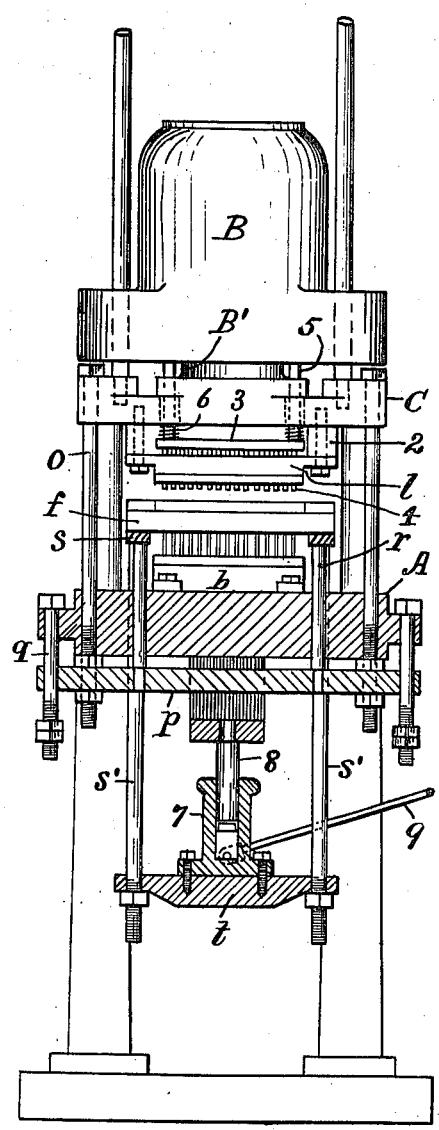
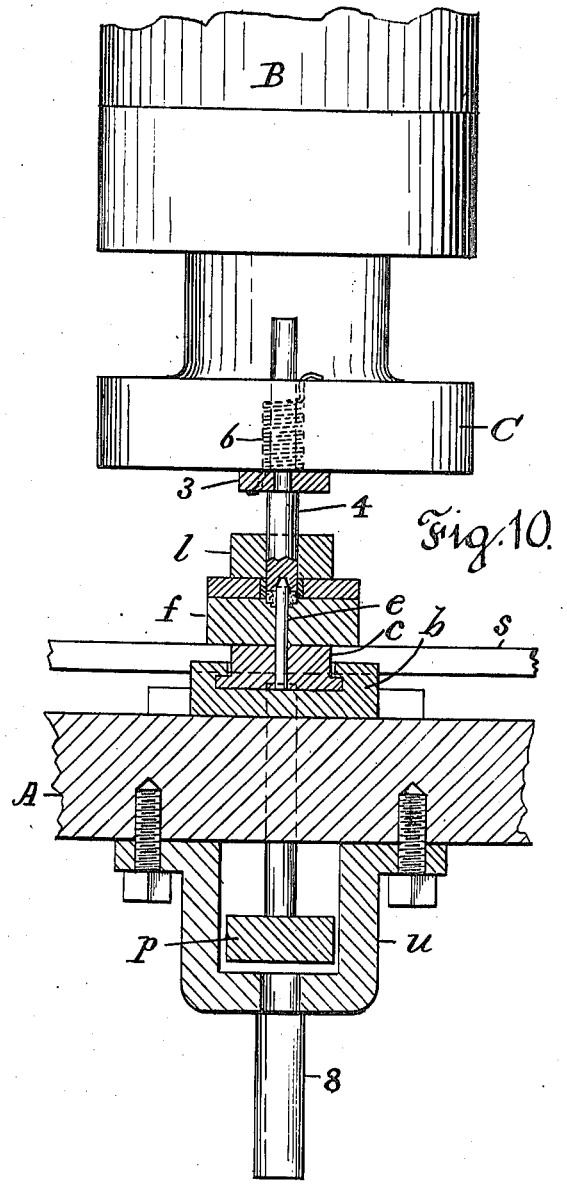

UNITED STATES PATENT OFFICE.

FRANCIS B. NORTHRUP, OF ORANGE, NEW JERSEY, ASSIGNOR TO THE CHARLES BURROUGHS COMPANY, OF NEWARK, NEW JERSEY, A CORPORATION OF NEW JERSEY.

INVERTED-RAM PRESS.

1,158,830.  Specification of Letters Patent.  Patented Nov. 2, 1915.

Application filed October 8, 1914. Serial No. 865,636.

*To all whom it may concern:*

Be it known that I, FRANCIS B. NORTHRUP, a citizen of the United States, residing at 106 Day street, Orange, county of Essex, and State of New Jersey, have invented certain new and useful Improvements in Inverted-Ram Presses, fully described and represented in the following specification and the accompanying drawings, forming a part of the same.

The present invention relates to a press for molding the sectional dies having parts separable from one another to remove the molded articles, and having one or more cores projected through the mold-cavity to form a hole or holes in the article.

The invention is applicable to molding any plastic material, especially such as is softened by heat; and which, by cooling the mold, may be hardened before the molded articles are discharged therefrom. Such materials are celluloid and bakelite, which are commonly supplied to the mold in a powdered form and softened by heat in the mold so as to yield to the pressure of the dies.

The object of the invention is to furnish a means of automatically separating the mold-parts and stripping the articles from the cores and from the mold-cavities, so that the articles may be removed from the press and fresh material applied to the mold-cavities for molding another batch of articles.

The invention is applicable to a die for molding a single article and having one or more cores penetrating such article, but it is especially useful in molding in one die a considerable number of small articles which could not be manually removed without a great deal of labor.

The invention comprises a foot-block to which the cores are attached, a lower plunger movable upon the cores and having mold-cavities upon its outer side, an upper plunger for pressing the material in the dies, and means actuated by the platen of the press when retracted, to move the lower plunger upon the cores to strip the articles therefrom. The restoration of the lower plunger to its original position to receive another charge of material causes the cores to push the articles out of the mold-cavities, from which cores the articles are then readily removable.

In the drawing, Figure 1 is a perspective view of a press embodying the invention; Fig. 2 is a vertical elevation of the principal parts of the press in section at the center line, where hatched, the view showing the longitudinal side of a sectional die; Fig. 3 is a plan of the return-ram and its stuffing-box; Fig. 4 is an elevation of the power-cylinder and the press-bed viewed from the end of the die with parts in section at the center line where hatched, and the lifter-rods and draw-bars broken for want of room upon the drawing; Fig. 5 is a plan of the press-bed with the die thereon and the connections for raising and lowering the lower plunger; Fig. 6 is an elevation of the press-bed and die with parts in section, where hatched, at the center line of the die and press-bed; Fig. 7 is a cross section on line 7—7 in Fig. 6 with the die closed; and Fig. 8 is a section on the same line with the die-parts separated. Fig. 9 is a front elevation of a press partly in section, where hatched, showing an alternative construction, with the return-cylinder omitted; and Fig. 10 is an elevation, upon a larger scale, of the bed-plate, the platen, and the die-parts shown in Fig. 9, the parts being in section where hatched at the middle of Fig. 9.

The drawing illustrates an embodiment of the invention in a hydraulic press having a power-cylinder B inverted over a press-bed A, and the ram B' of the cylinder operating to move a platen C to and from the bed A, which is connected with the cylinder by usual tie-rods D.

A return cylinder E is shown upon the top of the cylinder B with a return-ram F fitted thereto and attached to a cross-head H, from which tie-rods I are extended to the platen C.

A pipe $a$ is shown for supplying fluid to or withdrawing it from the power-cylinder B, and suitable valves are, in practice, connected with the pipe to control the operation of the ram B' in the desired manner.

A pipe $a'$ is shown connected with the cylinder E and is, in practice, constantly supplied with fluid under pressure, so that when the pipe $a$ is opened at the close of the molding operation, the return ram F automatically lifts the platen and forces the fluid from the power-cylinder.

The sectional dies are shown in Figs. 6, 7 and 8 inclusive, being shown with a bed-piece $b$ resting upon the press-bed A and channeled to removably hold a foot-block $c$ which is held in its working position upon the bed-piece by a pin or bolt *d* at the middle of its length, which permits it to expand equally from the middle point when heated, as is usual in molding operations.

The cores *e* are secured to the foot-block and project upwardly therefrom and are fitted movably to holes *e'* in the lower plunger *f*.

The lower plunger rests upon the foot-block in the molding operation, as shown in Figs. 6 and 7, and has mold-cavities *g* upon its outer side surrounding the core-holes *e;* and a chamber *h* to receive the molding material is formed of four plates *i* secured upon the outer side of the lower plunger, in which chamber the material to be molded is placed, and pressed by the upper plunger *j*. The four plates *i* may be said to form a mold-block.

The cores are so proportioned as to extend outward into the chamber *h*, and holes *k* are formed in the upper plunger to admit the ends of the cores.

The upper plunger is shown formed with a foot-block *l* shaped like the foot-block *c*, and fitted to the bed-piece *m* which is secured to the platen by bolts *n*. (See Fig. 6.)

The mold-parts are separated, as in Figs. 6 and 8, by connections to the platen C, which operate when the platen is raised, to directly withdraw the upper plunger from the mold-chamber *h;* and then by indirect connections to lift the lower plunger from the foot-block, thus sliding the lower plunger upwardly upon the cores and stripping the molded articles *g'* therefrom.

The articles are then pushed from the mold-cavities, by moving the platen downward sufficiently to restore the lower plunger to its contact with the foot-piece *c*, as shown in Fig. 6, the articles remaining upon the points of the cores, which are tapered to readily enter the articles, so that they do not slip downward upon the body of the cores, because fitted so tightly against the same by the shrinkage of the molded article. The articles are then readily removed from the points of the cores, and fresh material inserted in the chamber *h* around the cores to receive the pressure of the upper plunger.

These movements of the lower plunger are effected by lifting-rods *o* connecting the platen to a lift-bar *p* extended below the press-bed A, and having push-rods *r* extended upward through the bed A against the ends of the lower plunger which are projected beyond the ends of the foot-block for such purpose. The lift-bar *p* is limited in its downward movement by bolts *q* fitted through its end and through lugs *q'* upon the bed A, which arrest the lift-bar when the lower plunger is in contact with the foot-block. As the platen moves farther to press the upper plunger into the die-chamber *h*, the platen slides upon the lifting-rods *o*, the heads of which are shown in Fig. 2 above the top of the platen, which position they assume in such movement of the upper plunger. The upward movement of the platen thus operates to draw the upper plunger from the die before the platen strikes the heads of the lifting-rods *o* to lift the lower plunger from the foot-block. To carry the lower plunger down upon the foot-block when it has been lifted by the platen, cross-bars *s* are extended beneath the projecting ends of the lower plunger and connected by draw-bars *s'* with a spider or four-armed piece *t* and a spring *t'* supported upon a bracket *u* beneath the bed A, the tension of which spring is adjustable by a screw *u'* extended through the spider against the lower end of the spring, as shown in Fig. 2.

The bar *p* is shown extended beneath the center of the bed and platen, and the push-rods *r* are shown extended upward therefrom through the bed, and press upon the cross-bars *s* at the middle of their length, but the bar *p* may be made to operate push-rods through the bed A at any points so as to lift a lower plunger of any shape.

The draw-bars *s'* are shown connected with the ends of the cross-bars *s* outside the edges of the press bed A, and the spider *t* is formed with four arms to reach the said draw-bars.

The die is automatically opened by the lifting of the upper plunger from the die-chamber *h* when the platen C is raised, and the lower plunger is then automatically lifted by connection with the platen through rods *o* and *r* and lift-bar *p*.

During such lifting operation of the lower plunger, the spring *t'* is further compressed by the upward movement of the cross-bars *s* and the rods *s'*, and the reaction of the spring when the platen is lowered then draws the lower plunger automatically down against the foot-block, in which position the die is ready to be recharged.

The operation of the apparatus is as follows: To charge the die, the platen is lifted by discharging the pressing fluid from the cylinder B, permitting the return-plunger F to operate, and this lifts the upper plunger sufficiently from the lower plunger *f*, while resting on the foot-block *c*, to insert a suitable charge of material in the mold-chamber *h* around the cores, which project into such mold-chamber as long as the lower plunger rests upon the foot-block *c*. Such material may be supplied in a powdered form and the dies heated by the circulation of steam or hot water through passages *f'* in the lower plunger and upper plunger, as shown in Figs. 7 and 8. The means for supplying such heated fluid is not shown, as it is common in such constructions, and forms no part of the present invention. The material being thus rendered plastic, the pressing fluid is admitted to the cylinder B, and the ram and platen moved downward, forcing the material into the die-cavity around the cores and thus shaping the articles as desired. When the molding pressure has operated, cold brine, water, or other suitable cooling agent is circulated through the passages $f'$ instead of steam, thus chilling the dies and hardening the material so that the articles can be removed from the mold. This is effected by moving the platen upwardly, which operates first to draw the upper plunger $j$ from the mold-chamber $h$, and second, through the instrumentality of the rods $o$ and $r$, to lift the lower plunger from the foot-block $c$, thus stripping the cores from the molded articles. The platen is then reversed sufficiently to move the lower plunger into contact with the foot-block, such movement being caused directly by the ram 8 shown in Fig. 9, or the spring $t'$ shown in Fig. 2, when the platen is lowered sufficiently to withdraw the rods $r$ from contact with the lower plunger. This downward movement of the lower plunger causes the molded articles to stick upon the points of the cores, as their shrinkage when cooling makes them too small to slip downward upon the cores by their own weight, and the articles are thus wholly lifted from the die-cavity to a position accessible for removal.

Where the articles are of a shape or character to stick in the upper plunger rather than in the lower plunger, means is provided operating automatically when the platen is lifted, to push the articles out of the mold-cavities in the lower plunger. Such means is illustrated in Figs. 9 and 10, where the upper plunger is shown bolted to the platen with intermediate posts or foot-pieces 2, leaving a space in which a stripper-plate 3 may move vertically and carry a stripper-rod 4 for each of the mold-cavities in the upper plunger.

The stripper-rods are shown in Fig. 10 shaped to form the inner end of the cavity and thus shape one side of the article when molded, and are also recessed to receive the point of the core.

Guide-bars 5 are attached to the ends of the stripper-plate 3 and extended through the platen to contact with the lower end of the cylinder B when the platen moves sufficiently near to the same.

Tension-springs 6 are attached to the platen and the stripper-plate 3 and operate normally to draw the stripper-plate toward the platen, as shown in Fig. 10, and thus hold the movable ends of the stripper-rods flush with the bottom of the mold-cavity to complete the same.

The pressure of the material upon the ends of the stripper-rods during the molding operation is sustained by the platen, against which the stripper-plate 3 rests at such time, as shown in Fig. 10, but when the platen is moved away from the bed-plate to open the dies, the guide-rods 5, before the end of such opening operation, contact with the face of the cylinder B and force the stripper-rods through the mold-cavities, pushing the molded articles therefrom.

In Fig. 9, the platen is shown at the end of its lifting movement, with the guide-rods 5 pressed through the platen sufficiently to force the ends of the stripper-rods below the face of the upper plunger, as is shown at 4 in Fig. 9. At such time the lower plunger $f$ is moved to the upper ends of the cores and the stripped articles drop upon the points of the cores, upon which they are shown in Fig. 6.

A hydraulic cylinder 7 and ram 8 are shown in Fig. 9 substituted for the spring $t'$ of Fig. 2, to press the lower plunger downward after the articles are stripped from the cores, and a pipe 9 is shown connected with the cylinder to supply fluid under pressure for operating the same. Such pipe may be supplied continuously with fluid under a suitable pressure, or the supply may be controlled by a manually operated valve, or any other means.

The ram 8 and the spring $t'$ are obvious equivalents as both operate automatically to press the lower plunger downward after the articles are stripped from the cores, and either one may be described as a pressing agent mounted below the press A with connections to the lower plunger to press it downwardly.

In moving the platen C of Figs. 1 and 2, the actuating pressure upon the ram $B'$ is much greater than the continuous pressure upon the ram F, and is liable, if the movement is not limited, to break the rods I which connect the platen with the ram.

To avoid any excessive movement of the main ram when there are no dies in the press to arrest its movement, I have provided a device for warning the operator or relieving the water-pressure in the cylinders E and B when the return ram has nearly reached the bottom of the cylinder E, such device consisting of longitudinal slots or grooves $f'$ which are shown in Figs. 2 and 3 formed in one side of the return-ram near its upper end, of suitable length to reach through the stuffing-box $h'$ of the cylinder E into communication with the clearance-space inside such cylinder. By this construction, the water which is constantly under pressure in the cylinder E gains access to the slots $f'$ and blows out past the packing $h'$ of the return-cylinder E. This operates through the pipes $a$ and $a'$ to release the pressure in both the cylinders B and E, and it also throws a spray or shower of water over the operator standing by the press. The slots $f'$ are shown in one side only of the plunger so as to throw the spray to one side of the press, where the operator would stand in practice. The area of the slots is greater than that of the supply-pipe $a'$, and thus operates effectively to relieve or release the pressure.

It will be understood that the pipes $a$ and $a'$, shown in Fig. 2, are connected to the same pressure-fluid-supply, so that the releasing of the pressure in the cylinder E relieves the pressure in both the pipes $a$ and $a'$, and thus stops the movement of the main plunger B', and avoids overstraining of the rods I.

An insulating-plate $w$ is shown attached to the under side of the platen in Fig. 1, such plate having a series of ribs to contact with the platen and air-spaces between the ribs to radiate the heat to keep the ram B' cool. The bed-plate $m$ for the upper plunger is in such case bolted upon such insulating-plate, and the heat of the die is thus prevented from affecting the connected parts of the press. In some measure, this is also effected by the bed-piece $b$ which supports the foot-block $c$ upon the press-bed A.

It will be readily understood that the lifter-rods $o$ could be made to operate directly upon the ends of the lower plunger $f$; but the advantage of the present construction is that dies of various sizes and shapes may be used in the same press, and lifter-rods $r$ extend from the lift-bar $p$ through the press-bed A at any required points, to operate upon the lower plunger of the die. Holes would, of course, be required through the die-bed to introduce the rods $r$ at the required points. Any number of the rods $r$ may be used (two being shown in the drawing), and the rods may be made of different lengths, so as to move two or more parts of a mold successively and to different heights, as may be desired.

No specific claim is made herein to the sectional mold shown herein, as it is made the subject of a separate application No. 865,637 filed of even date herewith.

Having thus set forth the nature of the invention what is claimed herein is:

1. In a press for molding in sectional dies, the combination, with a bed-plate and a platen movable to and from the same, of a foot-block sustained upon the bed-plate and having parallel cores projected upwardly, a lower plunger movable upon the cores, an upper plunger carried by the platen for pressing the material in the die, a hydraulic ram with connections to the lower plunger to press it downwardly, a cross-bar below the bed-plate with connections through the bed-plate to move the lower plunger upwardly upon the cores, stops to limit the downward movement of the cross-bar and rods connecting the cross-bar with the platen to lift the cross-bar and the lower plunger, the rods being fitted movably to the platen to permit the descent of the same in the molding operation.

2. In a press for molding in sectional dies, the combination, with a bed-plate and a platen movable to and from the same, of a foot-block sustained upon the bed-plate and having one or more cores projected upwardly, a lower plunger movable vertically upon the core or cores with mold-cavity around each core, the lower plunger projecting at its ends beyond the ends of the foot-block and having transverse lifter-bars attached thereto, an upper plunger upon the platen, a spider below the bed-plate with rods connected to the ends of such lifter-bars, means operating at the center of the spider to draw the lower plunger normally downward, and lift-bars actuated by the platen when retracting the upper plunger from the die, to lift the lower plunger and strip the molded article or articles from the core or cores.

3. In a press for molding with sectional dies, the combination, with a bed-plate, and a platen movable to and from the same, of a foot-block sustained upon the bed-plate and having cores projected upwardly, a lower plunger movable upon the cores, an upper plunger carried by the platen, such lower plunger and cores having opposed mold-cavities surrounding the said cores, stripper-rods movable through the upper plunger and forming each the bottom of the mold-cavity therein, each rod having a central bore to receive the point of a core, and means actuated by the platen, when retracted, to push the stripper-rods through the upper plunger and discharge the molded articles from such cavities.

In testimony whereof I have hereunto set my hand in the presence of two subscribing witnesses.

FRANCIS B. NORTHRUP.

Witnesses:
CHARLES F. BURROUGHS,
FRANK L. MORTON.

It is hereby certified that in Letters Patent No. 1,158,830, granted November 2, 1915, upon the application of Francis B. Northrup, of Orange, New Jersey, for an improvement in "Inverted-Ram Presses," an error appears in the printed specification requiring correction as follows: Page 1, line 12, for the word "the" read *in;* and that the said Letters Patent should be read with this correction therein that the same may conform to the record of the case in the Patent Office.

Signed and sealed this 23rd day of November, A. D., 1915.

[SEAL.]

Cl. 25—84.

J. T. NEWTON,
*Acting Commissioner of Patents.*